United States Patent [19]

Vartanian et al.

[11] 4,201,554

[45] May 6, 1980

[54] FUEL ADDITIVE CONTAINING INNER QUATERNARY AMMONIUM SALT

[75] Inventors: Paul F. Vartanian, Wappingers Falls; Joseph B. Biasotti, Lagrangeville, both of N.Y.

[73] Assignee: Texaco Inc., White Plains, N.Y.

[21] Appl. No.: 860,544

[22] Filed: Dec. 14, 1977

[51] Int. Cl.$^2$ .............................................. C10L 1/22
[52] U.S. Cl. ...................................................... 44/62
[58] Field of Search ...................... 44/62, 70; 260/895

[56] References Cited

U.S. PATENT DOCUMENTS

| | | | |
|---|---|---|---|
| 2,737,452 | 3/1956 | Catlin et al. ............................ | 44/62 |
| 2,805,925 | 9/1957 | Biswell ................................... | 44/62 |
| 3,664,990 | 5/1972 | Slagel .................................... | 260/895 |
| 3,678,098 | 7/1972 | Lewis et al. ........................... | 526/312 |
| 4,039,634 | 8/1977 | Couchoud ............................. | 260/895 |

*Primary Examiner*—Winston A. Douglas
*Assistant Examiner*—Y. Harris-Smith
*Attorney, Agent, or Firm*—Thomas H. Whaley; Carl G. Ries; James J. O'Loughlin

[57] ABSTRACT

As a fuel additive, the reaction product of a polymer having an amine group and an $\alpha$-$\beta$-unsaturated $C_3$-$C_6$ aliphatic carboxylic acid. Also disclosed herein is a fuel component, especially gasoline, containing such a reaction product as a detergent.

4 Claims, No Drawings

FUEL ADDITIVE CONTAINING INNER QUATERNARY AMMONIUM SALT

BACKGROUND OF THE INVENTION

1. Field of the Invention

This invention relates to inner quaternary ammonium salts of copolymers. More especially, this invention relates to the reaction product of a polymer having an amine group, especially a tertiary amine group, and an $\alpha$-$\beta$-unsaturated $C_3$—$C_6$ aliphatic carboxylic acid. More especially, this invention relates to the use of such a polymeric material as a detergent for fuels, especially gasoline. This invention is particularly concerned with inner quaternary ammonium salts of copolymers having an amine group and their use to remove deposits from an engine carburetor.

2. Discussion Of The Prior Art

Various detergents have been proposed for use in fuels, especially gasoline. For instance, it has heretofore been proposed to employ as a gasoline detergent a condensation product of a secondary $C_{10}$ amine with maleic anhydride. Similarly, it has been proposed to use an amine of polyisocyanate detergent. Both of these known types of gasoline detergents are effective in removing deposit build-up from an automotive engine carburetor. However, the known commercially available types of gasoline detergents are particularly costly in production, thus adding to the final cost of gasoline at the pump.

It has become desirable, therefore, to provide less expensive, yet effective, gasoline detergents. It has heretofore been proposed by Catlin et al in U.S. Pat. No. 2,737,452 to employ as a fuel oil stabilizer at least 0.001 percent by weight of an oil soluble basic amino nitrogen-containing addition type polymer of a plurality of polymerizable ethylinically unsaturated compounds, at least one of which is amine-free and contains about 18 carbon atoms in an aliphatic hydrocarbon chain which, while in the polymer, is not part of the main polymer chain. The polymer also contains units which supply a basic amino nitrogen in a side chain, the polymer containing 0.1 to 3.5 percent by weight of basic amino nitrogen. The basic amino nitrogen is supplied by a compound such as $\beta$-diethylaminoethyl methacrylate. Such stabilizers are effective in stabilizing catalytically cracked fuel oils. They possess some degree of detergency.

It has become desirable to provide more effective and different gasoline detergents. More especially, it has become desirable to provide more effective detergents which are polymeric in nature and are derived from both nitrogen-containing and nitrogen-free comonomers.

SUMMARY OF THE INVENTION

The objects of this invention are provided by a reaction product of a polymer having an amine group and an $\alpha$-$\beta$- unsaturated $C_3$-$C_6$ aliphatic carboxylic acid.

It has been discovered, in accordance with the invention, that by reacting a polymer containing an amine group with an $\alpha$-$\beta$-unsaturated $C_3$-$C_6$ aliphatic carboxylic acid that there is provided a reaction product which is especially effective as a gasoline detergent.

The polymers which are reacted in accordance with the present invention are of the type disclosed by Catlin et al, U.S. Pat. No. 2,737,452, the disclosure of which is hereby specifically incorporated herein by reference. In accordance with the present invention, by reacting such known copolymers with an $\alpha$-$\beta$-unsaturated $C_3$-$C_6$ aliphatic carboxylic acid, there if formed what might be termed as an inner quaternary ammonium salt. The quaternary ammonium salts are formed especially when the polymer contains a tertiary amine group, i.e., the nitrogen atom is bonded to 3 organo moieties.

The invention can be more readily understood and appreciated when reference is made to the equation set forth below, showing what is believed to occur when a polymer containing a tertiary amine group reacts with an $\alpha$-$\beta$-unsaturated $C_3$-$C_6$ aliphatic carboxylic acid in accordance with the invention.

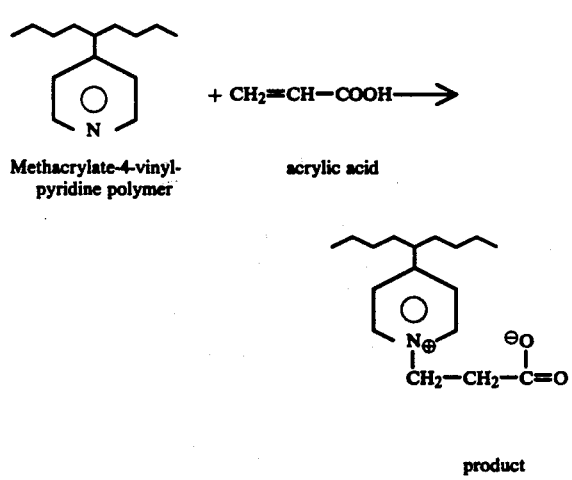

Methacrylate-4-vinyl-pyridine polymer    acrylic acid product

In the polymer above, the amine group is supplied employing 4-vinylpyridine as copolymer in the preparation of the basic polymer. It can be seen that an inner quaternary ammonium salt is formed by an unusual and unpredictable reaction.

Particularly contemplated $\alpha$-$\beta$-unsaturated $C_3$-$C_6$ aliphatic carboxylic acids are: maleic acid, acrylic acid, methacrylic acid, butenic acid and fumaric acid.

With respect to the polymers, generally speaking, it is preferred that the polymer have a tertiary nitrogen atom. It is particularly contemplated to react the $C_3$-$C_6$ aliphatic carboxylic acid with a polymer which itself is the olefin polymerization product of:

(A) a nitrogen amine free ester of a $C_1$-$C_6$ olefinically unsaturated aliphatic mono-, di- or polycarboxylic acid; and (B) an olefinically unsaturated comonomer containing a basic nitrogen atom in a side chain, especially a tertiary nitrogen atom.

The reaction product can be described as having the following formula

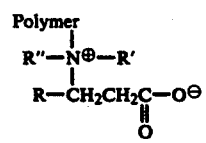

In the formula, R' and R" independently represent alkyl, alkenyl, aralkyl, alkynyl, aryl, heterocyclic, cycloalkyl and alicyclic. In the formula, R represents alkyl, alkenyl, alkyl carboxylate, carboxyl and alkenyl carboxylate.

Referring once again to the formula, R' and R", when alkyl, are preferably alkyl of up to 8 carbon atoms, especially up to 4 carbon atoms. When R' and R" are alkenyl, they preferably have between 2 and 6 carbon atoms in the chain. When R' and R" are aralkyl, they preferably contain 6 carbocyclic carbon atoms in the aryl portion and up to 8 carbon atoms in the alkyl portion. Alkynyl groups which are particularly contemplated for R' and R" are those alkynyl groups having up to 6 carbon atoms. Aryl groups contemplated are those containing from 6 to 18 carbocyclic carbon atoms. Particularly contemplated aryl groups are phenyl, biphenyl and naphthyl. Heterocyclic groups contemplated include particularly those heterocyclic groups having between 4 and 7 carbocyclic carbon atoms in the ring where the hetero group is oxygen, sulfur or nitrogen. Cycloalkyl groups particularly contemplated are those containing between 4 and 8 carbon atoms in the ring.

Where R is alkyl, it is preferably an alkyl group of 1 to 4 carbon atoms, especially methyl, ethyl, n-propyl, isopropyl, butyl and isobutyl. Where R is alkenyl, it is preferably a $C_2-C_4$ alkenyl group. Where R is an alkyl carboxylate group, the alkyl group has preferably 1 to 4 carbon atoms therein. Similarly, where R is an alkenyl carboxylate, it preferably contains between 2 and 4 carbon atoms in the chain.

R' and R" can also be taken together with a nitrogen atom to form a heterocyclic ring which can be saturated or unsaturated and preferably has between 4 and 7 carbocyclic carbon atoms in the ring.

The inner quaternary ammonium salts of the present invention are prepared by contacting the polymeric reactant with the unsaturated aliphatic carboxylic acid at a temperature of, for example, 150°-200° C. at a pressure between atmospheric and up to 10 atmospheres.

Generally speaking, a stoichiometric amount of unsaturated aliphatic carboxylic acid to polymer is employed, although a slight excess of the acid is desired, especially a 5 to 15 mol percent excess.

The reaction is carried out over a period of time sufficient to form the desired product. Generally, the reaction is performed for a period of between two and five hours, especially three to four hours.

While the process can be carried out in the absence of a solvent, solvents may be employed. Particularly contemplated solvents are high boiling solvents which will not be boiled off at the reaction temperatures contemplated and are inert to the reactants. Alternatively, lower boiling solvents can be employed if the pressure on the reaction mixture is sufficient to maintain the solvent in the liquid phase.

It is desired that the reaction mixture include a polymerization inhibitor, such as a composition which inhibits olefinic or vinyl polymerization of the unsaturated aliphatic carboxylic acid reactant. Preferably, such polymerization inhibitor is employed in an amount of 0.05 to 2 weight percent, especially 0.05 to 0.5 weight percent.

With respect to the copolymer, the copolymer is preferably one prepared in accordance with copending U.S. application Ser. No. 847,643, entitled *Use of Nitrogen Containing Polymers Prepared From Methacrylic Esters As Carburetor Detergents And Corrosion Inhibitors*, assigned to the assignee hereof, of Messrs. Cusano, Rubin, Jones and Vartanian, the disclosure of which is hereby incorporated herein by reference. The copolymer thereof comprises:

($A_1$) a $C_1-C_6$ saturated or unsaturated, substituted or unsubstituted, aliphatic or aromatic ester of an unsaturated, aliphatic, mono-, di-, or polycarboxylic acid of $C_1-C_6$ chain length in amounts of between 5 and 30 weight percent and most preferably 15 to 25 weight percent, based upon the weight of the copolymer; and ($A_2$) a $C_8-C_{20}$ saturated or unsaturated, substituted or unsubstituted, aliphatic or aromatic ester of an unsaturated aliphatic mono-, di-, or polycarboxylic acid of $C_1-C_6$ chain length in the amount of 50 to 81 weight percent based upon the weight of the copolymer. The balance of the copolymer is preferably made up of amino nitrogen containing compounds having a tertiary amino nitrogen atom. They are present in an amount of 4 to 20 weight percent, preferably 7 to 20 weight percent.

The esters are preferably esters of acids such as methacrylic, acrylic, fumaric, maleic or butenic acid. Where substituents are present on the ester group, said substituents can be halogen, cyano, hydroxyl, mercapto, or acetyl, it being understood that the amount of halogen or sulfur in the stabilizer is limited by upper limits for their content. Such preferred copolymer has a molecular weight determined by vapor phase osmometry of between 500 and 4,000.

The copolymer which is subjected to the reaction to form the inner quaternary ammonium salt can be prepared by conventional bulk solution or dispersion polymerization methods involving known initators including oxygen-yielding compounds such as benzoyl peroxide, di-tert.-butyl peroxide and azo initiators such as azobisisobutyronitrile. The polymers can be prepared in solution or neat.

Preferably, with respect to component $A_2$ supra, the same is, in turn, made up of a mixture of $C_{16}-C_{20}$ esters of $C_1-C_6$ aliphatic carboxylic acid and $C_{12}-C_{15}$ esters of aliphatic carboxylic acids. Thus, in turn, component $A_2$ preferably comprises:

($A_{2a}$) between 10 and 25 percent, especially 15 to 20 percent by weight, based upon the weight of the copolymer, of $C_{16}-C_{20}$ esters of a $C_1-C_6$ olefinically unsaturated aliphatic mono-, di- or polycarboxylic acid; and ($A_{2b}$) 40 to 60 weight percent, preferably 50 to 55 weight percent, based upon the weight of the copolymer, of $C_{12}-C_{15}$ esters of a $C_1-C_6$ olefinically unsaturated aliphatic mono-, di- or polycarboxylic acid.

The ester group itself is preferably an alkyl group, but can also be another group such as alkenyl, alkynyl, alicyclic, cycloalkyl, aralkyl and the like. Thus, the ester group can be both saturated and unsaturated and can contain oxygen or sulfur in the chain.

The esters used to form the copolymer are preferably both short chain esters, in accordance with component $A_1$, and long chain esters, in accordance with component $A_2$. It is to be understood that the esters of components $A_1$ and $A_2$ can be esters of the same or different carboxylic acid.

With respect to the olefinically unsaturated copolymer containing the basic amino nitrogen in the side chain, a wide variety of compounds are usable therefor. These compounds include tertiary amines which can be supplied by a wide variety of aliphatic, heterocyclic and aromatic compounds. Particularly contemplated amines are compounds such as p-($\beta$-diethylaminoethyl) styrene, basic nitrogen-containing heterocyclics where the nitrogen atom is bonded to three organic moieties and the compound contains a polymerizable ethylenically unsaturated substituent. The vinyl pyridines are examples of such compounds. Also contemplated are tertiary amines such as esters of basic amino compounds with unsaturated carboxylic acids such as the alkyl- and cycloalkyl-substituted amino alkyl and cycloalkyl esters of the acrylic and alkylacrylic acids, e.g., the dialkylaminoalkyl acrylates and alkylacrylates of which 4-diethylaminocyclohexyl-methacrylate is an example. Also contemplated are unsaturated ethers of basic amino alcohols, such as the vinyl ethers of such alcohols, including β-diethylaminoethyl vinyl ether. Amides of unsaturated carboxylic acids wherein a basic amino substituent is carried on the amide nitrogen are also contemplated, such as N-(β-dimethylaminoethyl) acrylamide, polymerizable, unsaturated basic amines, e.g., diallyl amine and the like.

The polymerization to form the basic copolymer is usually carried out in an inert atmosphere such as nitrogen or carbon dioxide at temperatures ranging from 30° to 150° C., depending upon the catalyst used, and generally at temperatures between 50° and 70° C. when an α-α'-azodiisobutyronitrile is employed as catalyst. It is important to carry out the copolymerization to such an extent that very little original monomer remains with the polymeric product.

The inner quaternary ammonium salt of this invention is useful in a fuel as a detergent thereof. It is particularly contemplated for use in gasoline, where it not only removes deposits from an engine carburetor, but actually prevents deposit build-up on the components of such carburetor. Generally speaking, the detergent is present in the fuel in an amount of between 0.005 and 1 weight percent, preferably 0.05 to 0.75 weight percent.

In order to more fully illustrate the nature of the invention and the manner of practicing the same, the following examples are presented:

EXAMPLES

Example 1

A nitrogen-containing polymer prepared from 4-vinyl pyridine, butylmethacrylate and a mixture of long chained esters of methacrylic acid was prepared by the following technique:

Into a one liter resin kettle fitted with external heating, thermometer, nitrogen inlet, stirrer and condenser, there was charged 54.5 percent by weight of Neodol 25L methacrylate (a $C_{12}$-$C_{15}$ side chain ester of methacrylic acid having an average chain length of 13.6 carbon atoms), 16.6 weight percent of Alfol 1620 methacrylate (a $C_{16}$-$C_{20}$ side chain ester of methacrylic acid having an average ester chain length of 17.1 carbon atoms), 20 percent by weight butylmethacrylate and 9 percent by weight 4-vinyl pyridine. The reactants were admixed with n-dodecylmercaptan and heated to 95° C. under a nitrogen blanket in the presence of azobisisobutyronitrile as polymerization initiator. Polymerization was permitted to continue until the polymerization was substantially complete. The polymerization was effected for a period of about six hours at 95° to 100° C.

PREPARATION OF INNER QUATERNARY AMMONIUM SALT

Example 1

A mixture of 100 grams of the polymer above-described having an average molecular weight of 2600 and 13 grams of maleic acid were heated at 190° C. for two hours. There was recovered a product which was the reaction product of the maleic acid and the nitrogen-containing polymer.

Example 2

Example 1 was repeated except that instead of reacting the basic polymer with maleic acid, 100 grams thereof were reacted with 25 grams of acrylic acid in the presence of 0.4 grams of hydroquinone (to inhibit polymerization of the acrylic acid). The reaction was conducted at 174° C. for three hours and excess acrylic acid was then removed by reduced pressure distillation to yield the desired product.

In order to evaluate the ability of the inner quaternary ammonium salt to remove deposits on a carburetor, a Chevrolet Carburetor Detergency Test, Phase III, was performed. According to this test, a running Chevrolet V-8 engine mounted on a test stand and fitted with a modified 4-barrel carburetor is employed. The two secondary barrels of the carburetor are sealed and the feed to each of the primary barrels is arranged so that detergent additive fuel can run in one barrel and reference fuel can run in the other. The primary carburetor barrels are also modified to contain removable aluminum inserts in the throttle plate area so that deposits adhering to the inserts can be conveniently weighed.

The engine is run for a period of time, usually 24 or 48 hours, using a base fuel as the feed to both carburetor barrels with engine blowby circulated to the carburetor air inlet. The weight of the deposits thus formed is measured and recorded. Upon completion of a test cycle, the inserts are removed from the carburetor and weighed to determine the difference between the performances of the test additive vis-a-vis the base fuel. After the aluminum inserts have been cleaned and replaced in the carburetor, the process is repeated with the fuel feeds to the carburetor in the test cycle reversed to minimize any differences in fuel distribution or carburetor construction. The results obtained in two runs are averaged and the effectiveness of the additive fuel in removing deposits is expressed in percent. Set forth below are the values obtained using an inner quaternary ammonium salt of a copolymer in accordance with the claimed invention.

| CHEVROLET CARBURETOR DETERGENCY TEST, PHASE III | | | |
|---|---|---|---|
| | Deposit, mg. | | Effectiveness, |
| Additive 100 PTB$^a$ Conc. | Build-Up | Removal | Percent |
| Example I | 29.6 | 16.3 | 55 |
| Example II | 29.9 | 22.8 | 76 |

$^a$PTB = pounds per thousand barrels additive and refers to the concentration of the inner quaternary ammonium salts of Examples I and II.

In order to determine the ability of an inner quaternary ammonium salt of the invention to prevent deposit build-up on the components of an automotive carburetor, a Buick Carburetor Detergency Test was conducted and the results compared with the results obtained using the same polymer in a non-inner quaternary ammonium salt form. The test was conducted using the 1973 Buick Carburetor Detergency Test which measures the ability of the detergent to prevent deposit build-up on an initially clean carburetor. The test uses the 1973 Buick 350 CID V-8 engine equipped with a two-barrel carburetor. The engine was mounted on a dynamometer test stand and had operating and exhaust gas return, an air induction reactor and a positive crankcase ventilator. The test cycle, shown in Table I, is representative of normal road conditions. Approximately 300 gallons of fuel and 3 quarts of oil were required for each run.

Prior to each run, the carburetor was completely reconditioned. Upon completion of the run, the throttle plate deposits were rated visually according to a merit rating scale of 1 to 10 with "1" applied to extremely heavy deposits on the throttle and "10" to a completely clean plate. The test was conducted under various stages, Stage I, Stage II and Stage III, representing different engine operating conditions insofar as engine speed, torque, duration, and the like. Thus, the test was conducted by initially running the engine at 650±25 r.p.m. for one hour followed by three hours at 1500±25 at 80±2 foot pounds torque followed by one hour at 2000±25 at 108±2 foot pounds torque. The cycles were repeated in such order for a total of 120 hours.

TABLE I

1973 BUICK CARBURETOR DETERGENCY TEST OPERATING CONDITIONS

|  | Stage I | Stage II | Stage III |
|---|---|---|---|
| Duration - hours | 1 | 3 | 1 |
| Speed, r.p.m. | 650 ± 25 | 1500 ± 25 | 2000 ± 25 |
| Torque, foot pounds | 0 | 80 ± 2 | 108 ± 2 |
| Water out, °F. | 205 ± 5 | 205 ± 5 | 205 ± 5 |
| Carburetor Air, °F. | 140 ± 5 | 140 ± 5 | 140 ± 5 |
| Exhaust Back Pressure, in. Hg. | — | 0.7 ± 0.1 |  |
| Man. Vac., in. Hg. | — | 15.8 | 14.2 |
| Fuel flow, pounds per hour | 0.7 | 7.5 | 12.0 |
| Test duration, 120 hours. |  |  |  |

The inner quaternary ammonium salt of the polymer was evaluated against the same polymer which had not been formed into an inner quaternary ammonium salt form. The results are set forth in Table II below:

TABLE II

BUICK TEST DATA

| Fuel | Dosages | Rating |
|---|---|---|
| Basic Fuel (without additive) | — | 3.0 |
| Example II Base Fuel + additive in form of inner quaternary ammonium salt | 25 PTB[a] | 5.9 |
| Example II Polymer in non-inner quaternary ammonium salt form (non-acrylated) | 100 PTB | 3.4 |

[a]PTB = pounds per thousand barrels

It is evident from the data above that the inner quaternary ammonium salt of the polymer of the invention is far more effective in preventing deposit build-up on the components of an automotive carburetor than the corresponding polymer in a non-inner quaternary ammonium salt form. In fact, the inner quaternary ammonium salt polymer of the invention is almost twice as effective as the non-quaternary ammonium salt of the same polymer.

In order to further demonstrate the ability of the inner quaternary ammonium salt of the invention to provide corrosion protection, the same was tested in accordance with the Colonial Pipeline Rust Test. In this test (similar to ASTM D-665 procedure), 300 ml of additive fuel and 30 ml of water are stirred at 100° C. in the presence of a polished steel spindle for three and one-half hours. At the end of the time period, the steel spindle is visually examined for signs of rust, with the ratings expressed in percent of area covered by rust. Set forth below are the ratings obtained with the polymers of Examples I and II of the invention vis-a-vis the non-acylated version of the polymer of Example II, the latter being tested at two different dosage levels.

TABLE III

COLONIAL PIPELINE RUST TEST[a]

| Additive | Dosage, PTB | Rating |
|---|---|---|
| None | — | 50–100 |
| Example I | 12½ | T-1 |
|  | 5 | 1-5 |
| Example II | 5 | T-1 |
| Example II (non-acylated) | 50 | 1-5 |
|  | 25 | 1-5 |

[a]Similar to ASTM D-665 test.

It is further evident from the data above that the polymers of the present invention are far more effective in inhibiting the formation of rust. It is particularly noted that when the non-acylated version is employed at 10 times the dosage level of the acylated version, it still does not provide the corrosion inhibition provided by the inner quaternary ammonium salt of the invention. Compare the results obtained by the polymer of Example II at the 5 PTB dosage level, with the results of the corresponding non-acylated polymer at the 25 and 50 PTB dosage levels.

From the foregoing, it is evident that the polymers of the present invention, on all accounts, are superior to the known non-inner quaternary ammonium salt polymers in removing deposit build-up from an automotive carburetor, in preventing deposit build-up on an initially clear auto carburetor, and in inhibiting rust formation on a steel spindle.

What is claimed is:

1. A motor fuel composition comprising a gasoline base fuel and from 0.005 to 1 weight percent of a carburetor detergent reaction product, said carburetor detergent reaction product being obtained by preparing an initial mixture consisting of from 5 to 30 weight percent of butyl methacrylate, 50 to 81 weight percent of a higher ester of methacrylic acid consisting of between 10 and 25% by weight of $C_{16}$–$C_{20}$ esters of methacrylic acid and 40 to 60 weight percent of a $C_{12}$–$C_{15}$ aliphatic ester of methacrylic acid, and from 4 to 20 weight percent of a nitrogen containing compound selected from the group consisting of 4-vinylpyridine and dimethylaminoethyl methacrylate and reacting said mixture in the presence of a polymerization catalyst and polymerization initiator to produce a first polymerization reaction product, mixing said first polymerization reaction product with an unsaturated acid selected from the group consisting of maleic acid and acrylic acid to form a second reaction mixture, and reacting said second reaction mixture at a temperature ranging from 150° to 200° C. to form said carburetor detergent reaction product.

2. A motor fuel composition according to claim 1 in which said initial reaction mixture consists of 10 to 30 percent of butyl methacrylate, 60 to 75 percent of said higher ester and 7 to 20 percent of said nitrogen containing compound.

3. A motor fuel composition according to claim 1 containing from 0.05 to 0.75 weight percent of said reaction product.

4. A motor fuel composition, according to claim 1 in which said initial mixture is polymerized in the presence of n-dodecylmercaptan.

* * * * *